(12) United States Patent
Johnson et al.

(10) Patent No.: US 7,162,021 B1
(45) Date of Patent: *Jan. 9, 2007

(54) CALL ROUTING CONTROL USING CALL ROUTING SCRIPTS

(75) Inventors: Lawrence Johnson, Sudbury, MA (US); Alberto Velella, Waltham, MA (US); David D. Smith, Merrimack, NH (US); James P. Twitchell, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/728,610

(22) Filed: Dec. 5, 2003

Related U.S. Application Data

(63) Continuation of application No. 09/595,938, filed on Jun. 16, 2000, now Pat. No. 6,665,393.

(51) Int. Cl.
*H04M 3/42* (2006.01)
(52) U.S. Cl. .......................... 379/207.14; 379/201.03; 379/211.01; 379/211.02; 379/212.01; 379/221.14; 379/225; 379/266.07
(58) Field of Classification Search ........... 379/207.14, 379/266.07, 207.15, 201.03, 211.01, 211.02, 379/212.01, 221.14, 225
See application file for complete search history.

(56) References Cited

U.S. PATENT DOCUMENTS

| | | | |
|---|---|---|---|
| 4,348,554 A | 9/1982 | Asmuth | 179/18 |
| 4,696,028 A | 9/1987 | Morganstein et al. | 379/88 |
| 4,737,983 A | 4/1988 | Frauenthal et al. | 379/221 |
| 4,757,267 A | 7/1988 | Riskin | 379/113 |
| 4,788,718 A | 11/1988 | McNabb et al. | 379/113 |
| 5,036,535 A | 7/1991 | Gechter et al. | 379/210 |
| 5,109,404 A | 4/1992 | Katz et al. | 379/88 |
| 5,164,983 A | 11/1992 | Brown et al. | 379/265 |
| 5,226,075 A | 7/1993 | Funk et al. | 379/243 |
| 5,271,058 A | 12/1993 | Andrews et al. | 379/210 |
| 5,282,244 A | 1/1994 | Fuller et al. | 379/230 |
| 5,291,550 A | 3/1994 | Levy et al. | 379/242 |
| 5,291,552 A | 3/1994 | Kerrigan et al. | 379/266 |
| 5,299,259 A | 3/1994 | Otto | 379/221 |
| 5,309,513 A | 5/1994 | Rose | 379/265 |
| 5,333,133 A | 7/1994 | Andrews et al. | 370/58.2 |
| 5,333,188 A | 7/1994 | Bogart et al. | 379/220 |
| 5,333,308 A | 7/1994 | Ananthanpillai | 395/575 |
| 5,335,233 A | 8/1994 | Nagy | 371/32 |
| 5,381,415 A | 1/1995 | Mizutani | 370/110.1 |
| 5,442,691 A | 8/1995 | Price et al. | 379/220 |
| 5,465,286 A | 11/1995 | Clare et al. | 379/34 |
| 5,528,678 A | 6/1996 | Kaplan | 379/201 |
| 5,530,744 A | 6/1996 | Charalambous et al. | 379/265 |
| 5,537,470 A | 7/1996 | Lee | 379/266 |
| 5,537,611 A | 7/1996 | Rajagopal et al. | 379/221 |
| 5,539,756 A | 7/1996 | Glaise et al. | 371/37.1 |
| 5,546,452 A | 8/1996 | Andrews et al. | 379/219 |

(Continued)

*Primary Examiner*—Quynh H. Nguyen
(74) *Attorney, Agent, or Firm*—Cesari and McKenna LLP

(57) ABSTRACT

A technique for use in controlling routing of a call in a communications system is provided. In one embodiment of the technique, a call routing script is used. The script includes at least one call routing instruction that refers to a variable whose value is stored externally to the script. The value of the variable is determined by the system when the system executes the script for determining a destination for the call. The value of the variable is stored in a database, and the database is read to determine the value of the variable.

38 Claims, 7 Drawing Sheets

U.S. PATENT DOCUMENTS

| | | | |
|---|---|---|---|
| 5,546,456 A | 8/1996 | Vilsoet et al. | 379/265 |
| 5,555,297 A | 9/1996 | Ochy P. et al. | 379/136 |
| 5,557,668 A | 9/1996 | Brady | 379/212 |
| 5,563,940 A | 10/1996 | Tsuzuki et al. | 379/233 |
| 5,568,544 A | 10/1996 | Keeler et al. | 379/273 |
| 5,577,105 A | 11/1996 | Baum et al. | 379/93 |
| 5,586,177 A | 12/1996 | Farris et al. | 379/230 |
| 5,590,181 A | 12/1996 | Hogan et al. | 379/114 |
| 5,590,188 A | 12/1996 | Crockett | 379/225 |
| 5,592,477 A | 1/1997 | Farris et al. | 370/396 |
| 5,633,924 A | 5/1997 | Kaish et al. | 379/266 |
| 5,649,108 A | 7/1997 | Spiegel et al. | 395/200.12 |
| 5,689,518 A | 11/1997 | Galand et al. | 371/37.1 |
| 5,694,407 A | 12/1997 | Glaise | 371/53 |
| 5,715,306 A | 2/1998 | Sunderman et al. | 379/265 |
| 5,757,895 A | 5/1998 | Aridas et al. | 379/136 |
| 5,787,160 A | 7/1998 | Chaney et al. | 379/220 |
| 5,787,163 A | 7/1998 | Taylor et al. | 379/265 |
| 5,848,143 A | 12/1998 | Andrews et al. | 379/219 |
| 5,873,130 A | 2/1999 | Lafferty | 2/16 |
| 5,878,130 A | 3/1999 | Andrews et al. | 379/265 |
| 6,072,773 A | 6/2000 | Fichou et al. | 370/230 |
| 6,549,619 B1 * | 4/2003 | Bell et al. | 379/210.02 |

* cited by examiner

CALL ROUTING CONTROL USING CALL ROUTING SCRIPTS

CROSS-REFERENCE TO RELATED APPLICATIONS

The present application is a continuation of U.S. patent application Ser. No. 09/595,938, which was filed on Jun. 16, 2000, of common inventorship, which issued on Dec. 16, 2003 and is assigned U.S. Pat. No. 6,665,393 B1.

BACKGROUND OF THE INVENTION

1. Field of the Invention

The present invention relates generally to a technique for use in controlling the routing of calls in a communications system, and more specifically, to such a technique wherein call routing scripts are used in controlling call routing.

2. Brief Description of Related Prior Art

Systems for routing calls through public and/or private communications networks are known in the art. Conventional automatic call distribution (ACD) systems route calls to agents in telemarketing and service inquiry centers, and provide limited real-time call management and reporting capabilities. A typical ACD system will monitor the status of the agent and, when an incoming call is received, selects the agent to handle a particular service request. Reporting and performance data from the agents are also generated by the ACD.

One particular type of scheme for distributing calls to agents is disclosed in Frauenthal et al., U.S. Pat. No. 4,737,983. According to Frauenthal et al., data representing the present call congestion of each of the ACD systems is accumulated in a data base. Using the data in the data base, the percentage of calls made to the ACD systems, as a group, is determined. The information is then used to generate call routing information. When a new call is made to the central office, the routing information is queried to determine which of the ACD systems is to receive the call, so as to balance the call traffic load across the ACD systems.

Another call distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al., when an incoming call is made to the call router, it decides which agent station should receive the call, establishes a call with that agent station, and then transfers the original call onto the second call to connect the incoming caller directly to the agent station and then drops out of the connection (See, Gechter et al., column 11, lines 45–51).

Other prior art call routing and distribution techniques are disclosed in Andrews et al., U.S. Pat. No. 5,873,130, which is assigned to the assignee of the subject application. This patent discloses a communications system and method for automatically making telephone routing decisions with global authority based upon information gathered in real time from the entire communications system and global optimization criteria. The entirety of the disclosure of the Andrews et al. patent is incorporated herein by reference.

In conventional call processing systems, calls may be routed in accordance with call routing control scripts executed by the system. These scripts may comprise one or more call routing instructions that when executed by the system cause the system to route the call to a desired destination; such destinations are commonly called "labels." A "label" may be a particular destination telephone number, trunk group, or dialed number identification service ("DNIS") number.

Heretofore, such labels have been expressly recited in the scripts' instructions. That is, heretofore, the labels have been expressed in the scripts as specific constant numerical values corresponding to e.g., particular destination telephone numbers, trunk groups, and/or DNIS numbers. Unfortunately, this makes modification of the labels in the scripts difficult, as such modification may require e.g., line-by-line searching and replacement of code in the scripts (i.e., to change the values of the labels), and also makes less modular the script code. As a result, a significant burden may be placed upon script programmers in terms of script coding and debugging time, effort, and frustration. Additionally, the use of constant value labels in the scripts decrease adaptability and flexibility of the scripts for use in other call routing applications.

SUMMARY OF THE INVENTION

In accordance with the present invention, a technique is provided for use in controlling the routing of calls in a communications system that overcomes the aforesaid and other disadvantages of the prior art. In one embodiment of the technique of the present invention, a call routing script is generated that includes at least one call routing instruction of a predetermined type that references a variable. The value of the variable is determined by the system when the system executes the script (i.e., at script run-time), and a call is routed to a desired destination based upon the value of the variable computed by the system at run-time.

The at least one instruction of predetermined type may contain a variable expression whose value may be computed at script run-time by the system for use by the system in determining a desired call destination. When computed, the variable expression's value may specify a destination telephone number, trunk group, and/or DNIS number to which the call is to be routed by the system.

The system may include a user-modifiable database in which a plurality of different respective variables that may be referenced by the call routing instruction may be stored in association with their respective values. The execution by the system of the call routing instruction may cause the system to retrieve the respective value of the variable referenced by the instruction from the database and to perform call routing based upon this value.

Advantageously, the technique of the present invention may be used to replace a constant-value label in a call routing script with a variable or variable expression whose respective value may be computed at script run-time based upon a value in a database external to the script. By simply modifying the value in the database, the value utilized in the script at run time to determine call destination also may be modified. Advantageously, this makes modification, testing, and debugging of call routing control scripts in accordance with the present invention much easier and less time consuming than in the prior art, and increases the adaptation flexibility of scripts according to the present invention.

It will be appreciated by those skilled in the art that although the following Detailed Description will proceed with reference being made to illustrative embodiments and methods of use, the present invention is not intended to be limited to these embodiments and methods of use. Rather, the present invention is of broad scope and is intended to be limited as only set forth in the accompanying claims.

BRIEF DESCRIPTION OF THE DRAWINGS

Other features and advantages of the present invention will become apparent as the following Detailed Description proceeds, and upon reference to the Drawings, wherein like numerals depict like parts, and wherein.

DETAILED DESCRIPTION OF ILLUSTRATIVE EMBODIMENTS

Figure 1:
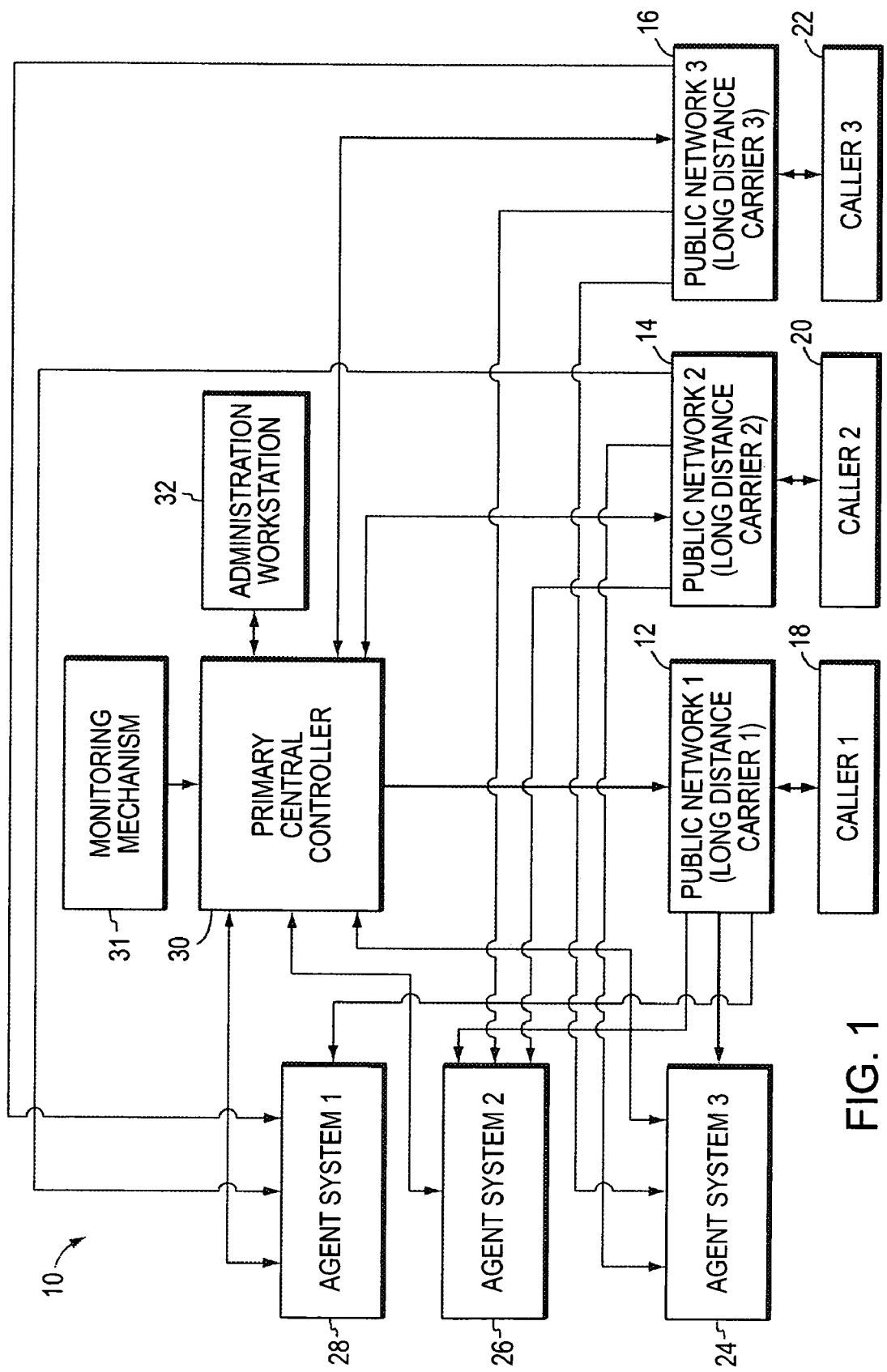
FIG. 1 is a functional block diagram of one embodiment of a communications system wherein the technique of the present invention may be practiced to advantage.

FIG. 1 is an architectural-level block diagram illustrating functional components of a communications system 10 wherein one embodiment of the technique of the present invention may be practiced. System 10 includes a plurality of agent systems 24, 26, 28 connected to a primary central controller 30 and a plurality of conventional public telephone and/or long distance carrier networks (e.g., MCI, Sprint, AT&T) 12, 14, 16. Callers 18, 20, 22 place calls to the agent systems 24, 26, 28 via public networks 12, 14, 16. As will be explained more fully below, primary central controller 30 generates control signals for controlling routing and distribution of calls through the long distance carriers to and from the agent systems, and through the agent systems themselves to and from individual workgroups, customer agents and/or caller services, based upon requested service data (e.g., telephone numbers and other information) supplied by callers through the public networks, status messages (i.e., availability of resources for use by callers, loading of system resources, etc.) supplied by the agent systems, and user-generated call routing control scripts) stored in controller 30. Administration workstation 32 permits user access and control of the system 10 by, for example, permitting generation and modification of system configuration data, call routing scripts, etc. stored in controller 30. Monitoring and diagnostic mechanism 31 monitors the various elements of the system (i.e., the agent systems 24, 26, 28, administration means 32, etc.) to determine whether these elements are functioning properly. If a malfunction is detected, that fact is signaled to the central controller 30, so that it can undertake appropriate action to correct and/or eliminate the malfunction and/or any resulting problems to the system 10 from the malfunction.

Although not shown in the Figures, each of the conventional long distance carriers 12, 14, 16 includes a long distance control network (e.g., AT&T's Signaling System 7 (SS7) control network, MCI's TCP/IP-based control network, Sprint's X.25-based control network and/or foreign telecommunication's CCITT SS7-based control network) and local exchange carriers. The long distance control networks control routing of calls through the long distance network serviced by the exchange carriers. When a long distance call request is received (e.g., a caller dials a long distance telephone number) by the exchange carrier, it forwards the call to the long distance network, which routes the call to its intended destination. In system 10, when the long distance control network receives a request for long distance connection to one of the agent systems 24, 26, 28 (or, as will be explained more fully below, to one of the agent systems' workgroups or caller services), the long distance control network forwards the long distance routing request to the central controller 30. As will be described more fully below, central controller then processes the request and controls the system 10 to route the call to a destination in accordance with call routing control scripts executed by the controller 30. The system 10 accomplishes call routing by, inter alia, translating the routing request message into a route response message for addressing the desired destination. System 10 also supports routing of calls across local exchange carriers and international PTT's by utilizing substantially the same call control and distribution techniques discussed above.

Figure 2:
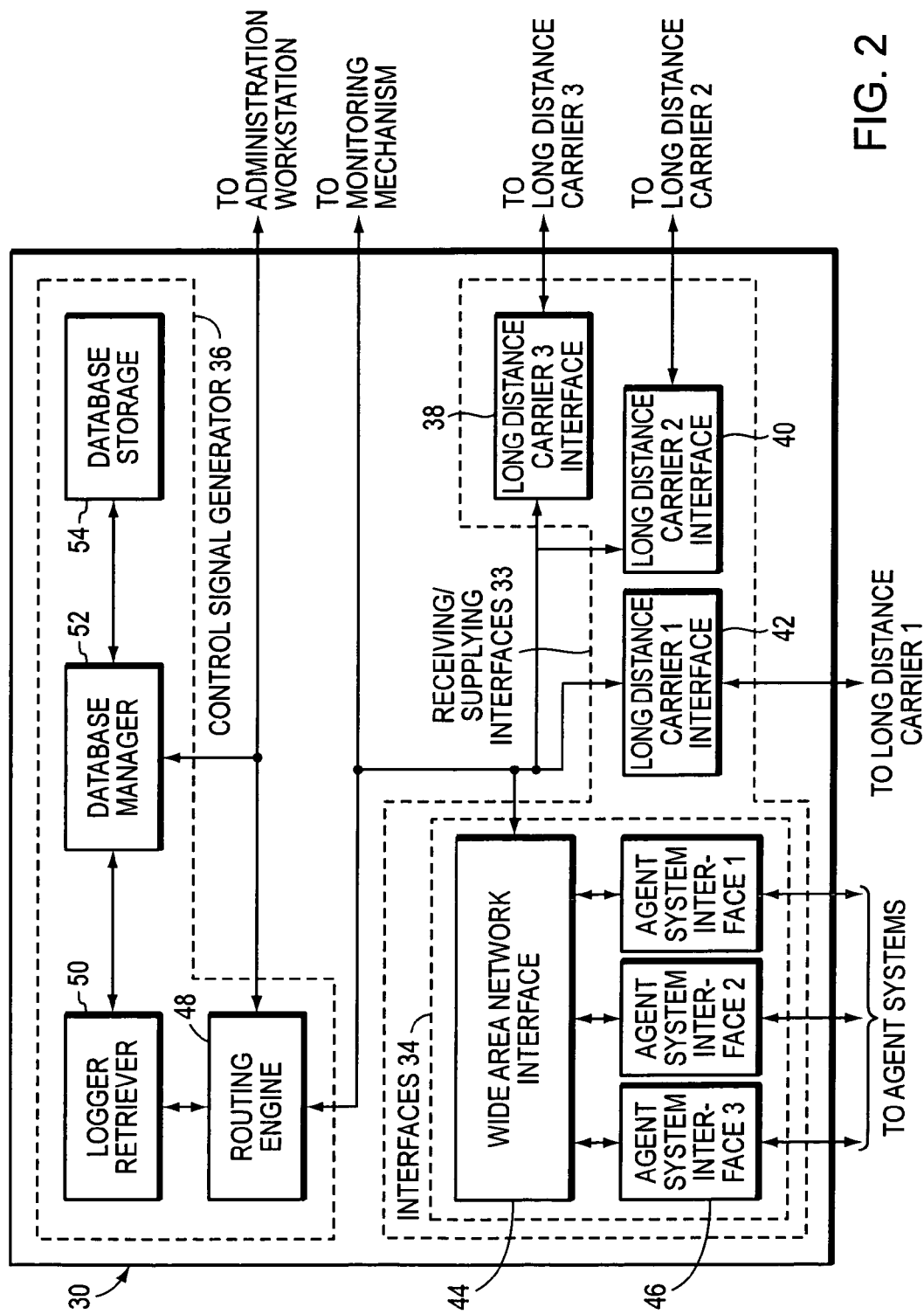
FIG. 2 is a functional block diagram of the primary central controller of the system of FIG. 1.

FIG. 2 is a schematic block diagram illustrating functional components of the central controller 30. Controller 30 includes interfaces 33 for receiving status messages and caller service requests, and for supplying control signals generating by the controller 30 to the public networks and the agent systems. Interfaces 33 include long distance carrier interfaces 38, 40, 42 for interfacing the controller 30 to the public networks 12, 14, 16, respectively. Each of the interfaces 38, 40, 42 is appropriately constructed to permit transmission of control signals and receipt of caller service requests from the respective network to which it is connected. For example, if carrier interface 42 is connected to an AT&T network, then it is appropriately constructed to permit transfer of control signals and service requests between the controller 30 and the SS7 network. Other types of carriers must also be similarly accommodated by appropriately constructing the other interfaces 40, 38 to permit exchange of such data between these networks and the controller 30.

Interfaces 33 also include agent gateways (i.e., interfaces) 34 for interfacing the controller 30 to the agent systems 24, 26, 28. Interfaces 34 include agent systems interfaces 46 connected to a conventional wide area network 44. Wide area network 44 connects the controller 30 to the interfaces 34 so as to permit transmission of status messages from the agent systems to the controller 30, and to permit transmission of control signals to the agent systems 24, 26, 28. It should be understood that the particular types of interfaces 46 used will depend upon the particular constructions of the agent systems, the wide area network, and the controller. Wide area network 44 may be a conventional TCP/IP (Transmission Control Protocol/Internet Protocol) network, although alternatively, network 44 may be constructed to use other types of network protocols.

Control signal generator 36 is connected to the interfaces 33, monitoring mechanism 31, and administrative workstation 32. Control signal generator 36 comprises routing engine 48, database logger/retrieving engine 50, database manager 52, and database 54. Routing engine 48 determines how to route calls in the system 10 (i.e., through the public networks to the agent systems, and in the agent systems themselves), and transmits this routing information (in the form of appropriate control signals, such as routing response messages) for addressing the desired end-termination (e.g., a workgroup/caller service in the system) to interfaces 33, 34 for transmission to the agent systems and long distance control networks, respectively. In order to determine how to route calls in the system, routing engine 48 takes into consideration real-time requested service data supplied to it by the interfaces 33, system configuration data 202 and historical (i.e., previously stored) requested service data and status messages 204 retrieved by logger/retriever 50 at the command of the routing engine 48 from the system's historical database (comprising database manager 52 and storage mechanism 54), real-time status messages from the agent systems supplied to it from the interfaces 34, information from the monitoring mechanism 31 concerning what components (if any) of the system are currently unavailable because they are malfunctioning or inoperative, and routing optimization criteria and/or rules and commands in the form of call routing control scripts 200 generated by the administration workstation and stored in database 54. Routine engine 48 uses this data to determine the manner in which to route calls in the system. After making its decision on how best to route a particular call, generating appropriate control signals to implement this decision, and transmitting the control signals to the interfaces 33 and 34, routing engine 48 instructs logging engine 50 to store the real-time information presented above in the database 54 for use in determining how to route later calls. Logging engine 50 in turn, commands database manager 52 to store this information in database 54. Scripts 200 may comprise corporate and/or customer-generated call routing scripts.

Figure 3:
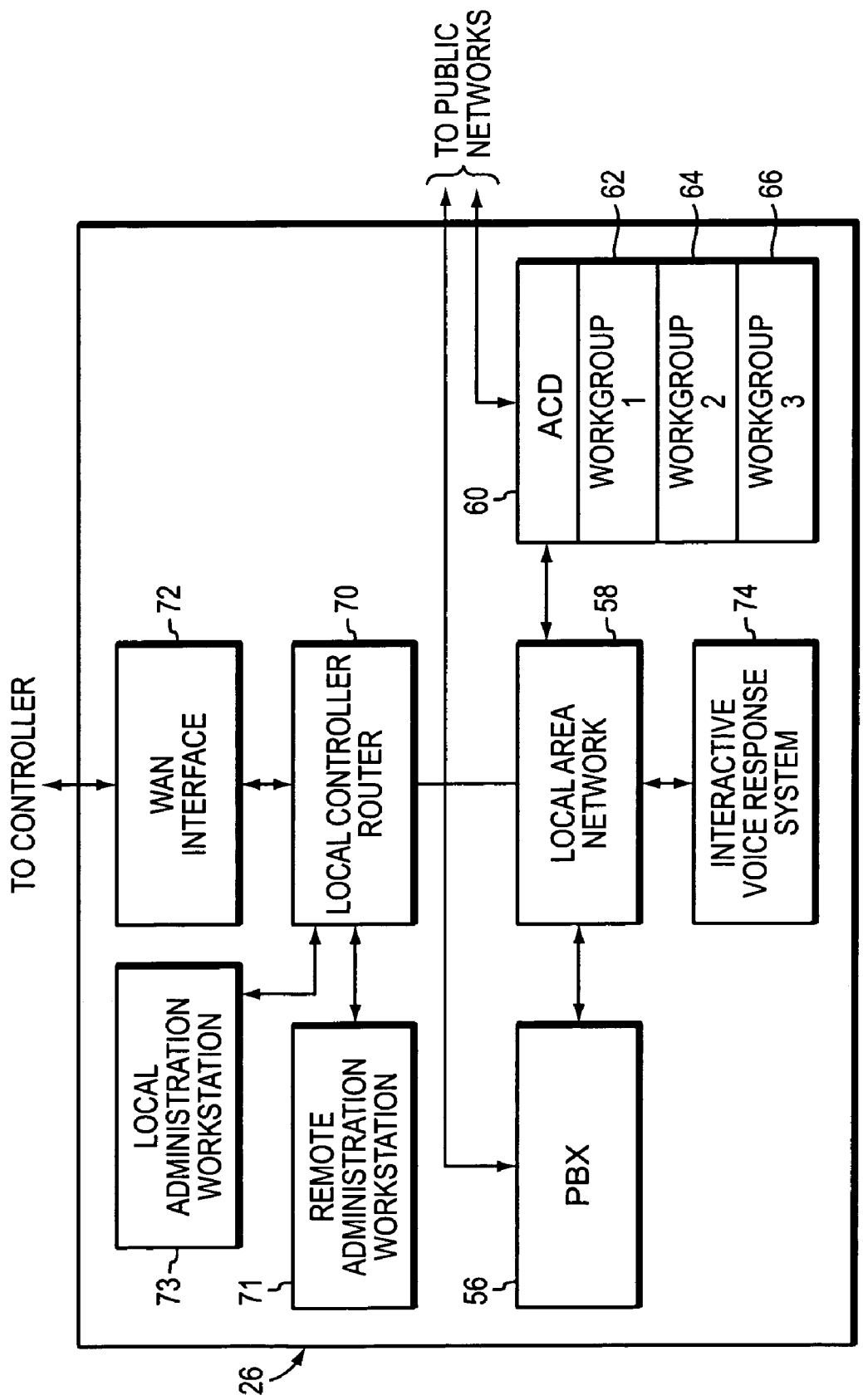
FIG. 3 is a functional block diagram of an agent system of the system of FIG. 1.

FIG. 3 is a functional block diagram of an agent system 26. Agent system 26 may comprise wide area network interface 72 for interfacing the agent system's local controller/router 70 to the controller's wide area network 44, so as to permit transfer of control signals from controller 30 to local controller 70 and status message from the local controller 70 to controller 30. In response to control signals received by local router 70 from controller 30, local router 70 issues commands to the ACD/IVR, or PBX system causing public network interfaces (not shown) in the ACD, PBX or IVR to connect calls received thereat from the public networks to appropriate caller services (e.g. interactive voice response system 74) or individual agents (e.g. private branch exchange (PBX) 56 or ACD 60). It should be noted that the particular type and number of caller services and individual agents shown in FIG. 3 are merely for illustrative purposes and may vary. Local router 70 issues commands via the conventional local network 58 to the caller service or individual agent system to which the call is connected, as to how the individual agent or caller service is to distribute or process the call. For example, depending upon the control signals transmitted by the controller 30 to controller 70, controller 70 may instruct the call to be forwarded directly to the interactive voice response system 74 which is connected as an answering resource to ACD 60, and instruct the interactive voice response system to store information from the call for later retrieval and transmission to a workstation (not shown) connected to the PBX 56, or to connect the call to the ACD 60 and instruct the ACD to forward the call to one of its workgroups 62, 64, 66. Of course, it will be appreciated that if appropriately modified, the network interfaces may be comprised within the public networks or may comprise a separate, stand-alone interfaces distinct from the agent systems. Likewise, if the PBX, IVR, and/or ACD are appropriately modified so as to include other of the various functional components of the agents (e.g. router 70), they may be eliminated, or comprised as separate functional components from the agent system.

Local controller 70 also queries the individual agents and caller services for status information (e.g. whether they are active or busy, what resources are available for use by callers, etc.), gathers this status information via the local network 58, and transmits this information to the central controller 30 via interface 72 for use in the central controller's routing decisions. In this way, the central controller 30 may automatically control routing of calls not only through the public networks, but also in the agent systems, according to status information gathered from the entire system, using the call routing scripts and global call distribution criteria.

Agent system 26 may also comprise local administration workstation 73 for permitting user control of the local router 70, and remote administration workstation 71 for permitting remote control of central controller 30. Both administration workstations 73, 71 are of similar construction to administration workstation 32. Local administration workstation 73 may be limited in its ability to control local router 70 (i.e., only to control matters not being controlled by central controller 30). Likewise, remote administration workstation 71 may be limited in its authority over system 10 such that administration workstation 32 may override commands issued by administration workstation 71.

Figure 4:
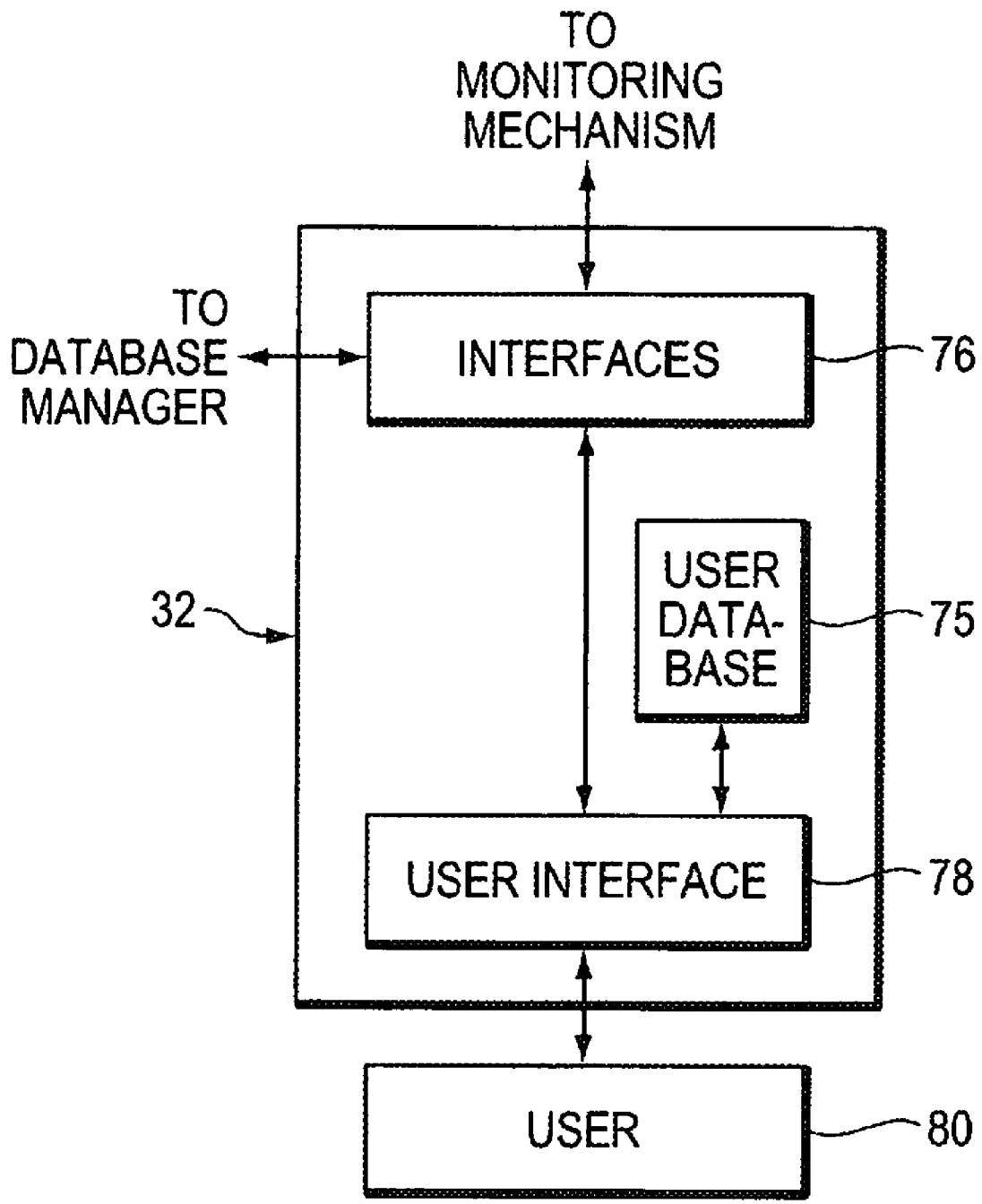
FIG. 4 is a functional block diagram of an administrative workstation used in the system of FIG. 1.
Figure 5:
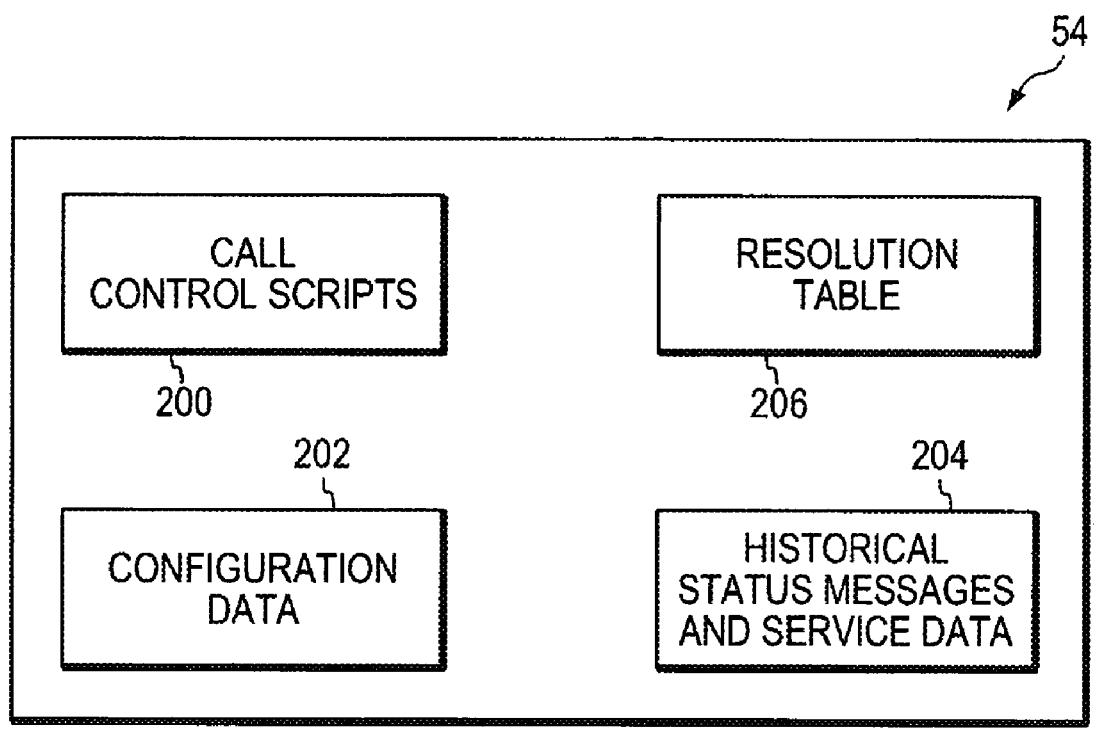
FIG. 5 is a schematic block diagram illustrating data structures in the database shown in FIG. 4.

FIG. 4 is a functional block diagram of administration workstation 32. Workstation 32 may comprise a user input/output interface 78 connected to central controller interface 76. User interface 78 may comprise a graphical user interface for permitting a human user 81 to generate, edit, and store call control routing scripts 200, system configuration data 202, etc. in the database 54 of the central controller 30. The database interface 76 is adapted to change the user's graphically input data into a form usable by the central controller in the central controller's database 54. Administration workstation 32 comprises a user-accessible database 75 for storing real-time information and configuration information and for permitting such information to be communicated to a human user via the user interface 78. Also, administration workstation 32 permits a user to monitor various system activities and current system information, such as, call routing, system configuration, etc.

The above-presented functional components (with the exception of networks 12, 14, and 16) of system 10 may be embodied as one or more distributed computer program processes executing in a plurality of computer nodes; each of these nodes may include computer-readable memory for storing software programs, algorithms, and data structures associated with, and for carrying out, the inventive techniques, and related and other techniques and methods described herein as being carried out by or implemented in system 10. In addition, each of these nodes may further include a processor (e.g., an Intel 80×86 processor) for executing these software programs and algorithms, and for manipulating the stored data structures, to enable the nodes to carry out these methods and techniques in system 10. Additionally, the nodes may be provisioned with such networking hardware and software (e.g., including computer networking and telephonic communications hardware and software) as is needed to enable performance of the stated functionality.

It should be noted that the functional components of the system 10 may vary depending upon particular functional and operational requirements. For example, the existing components of system 10 may be modified to incorporate the functionality of, or the system 10 may be modified to include, fault-tolerance-related functional components (e.g., a redundant central controller), components related to processing of Internet calls, and/or call-queuing-related components described in the aforesaid Andrews et al. patent (i.e., U.S. Pat. No. 5,873,130). Accordingly, it should be appreciated that the present invention may be practiced in systems other than system 10 (e.g., in systems having different and/or additional functional components like those described in the aforesaid Andrews et al. patent, and other communications systems).

In accordance with one embodiment of the technique of the present invention that may be practiced in system 10, user 80 may input via interface 78 call routing control scripts 200 which, after being inputted, may be stored in database 54. Interface 78 also permits the user 80 to input and store in database 54 a variable resolution table 206 (whose contents and purpose will be discussed below).

Figure 6:
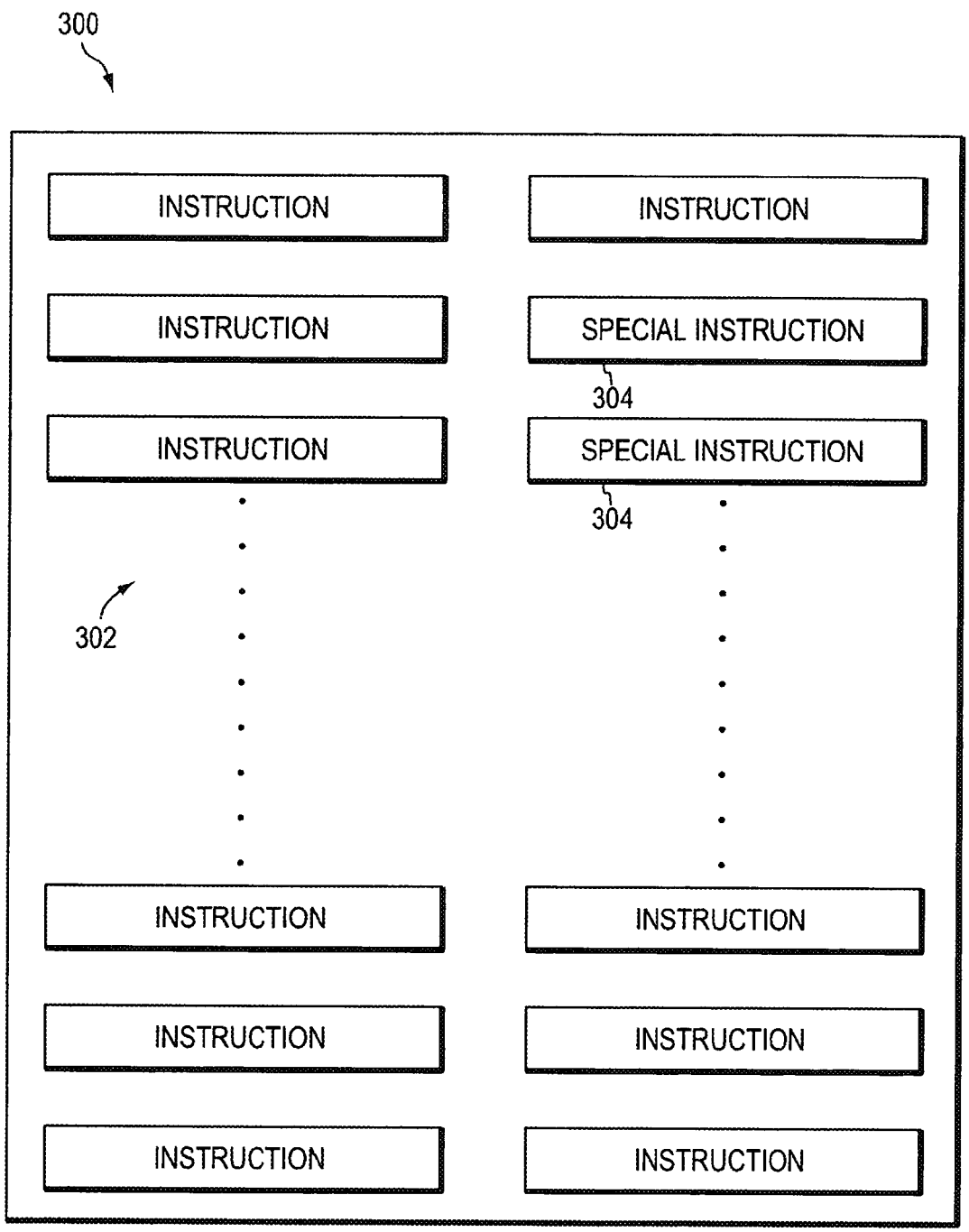
FIG. 6 is a schematic diagram illustrating contents of a call routing control script that may be stored and used in the system of FIG. 1.
Figure 7:
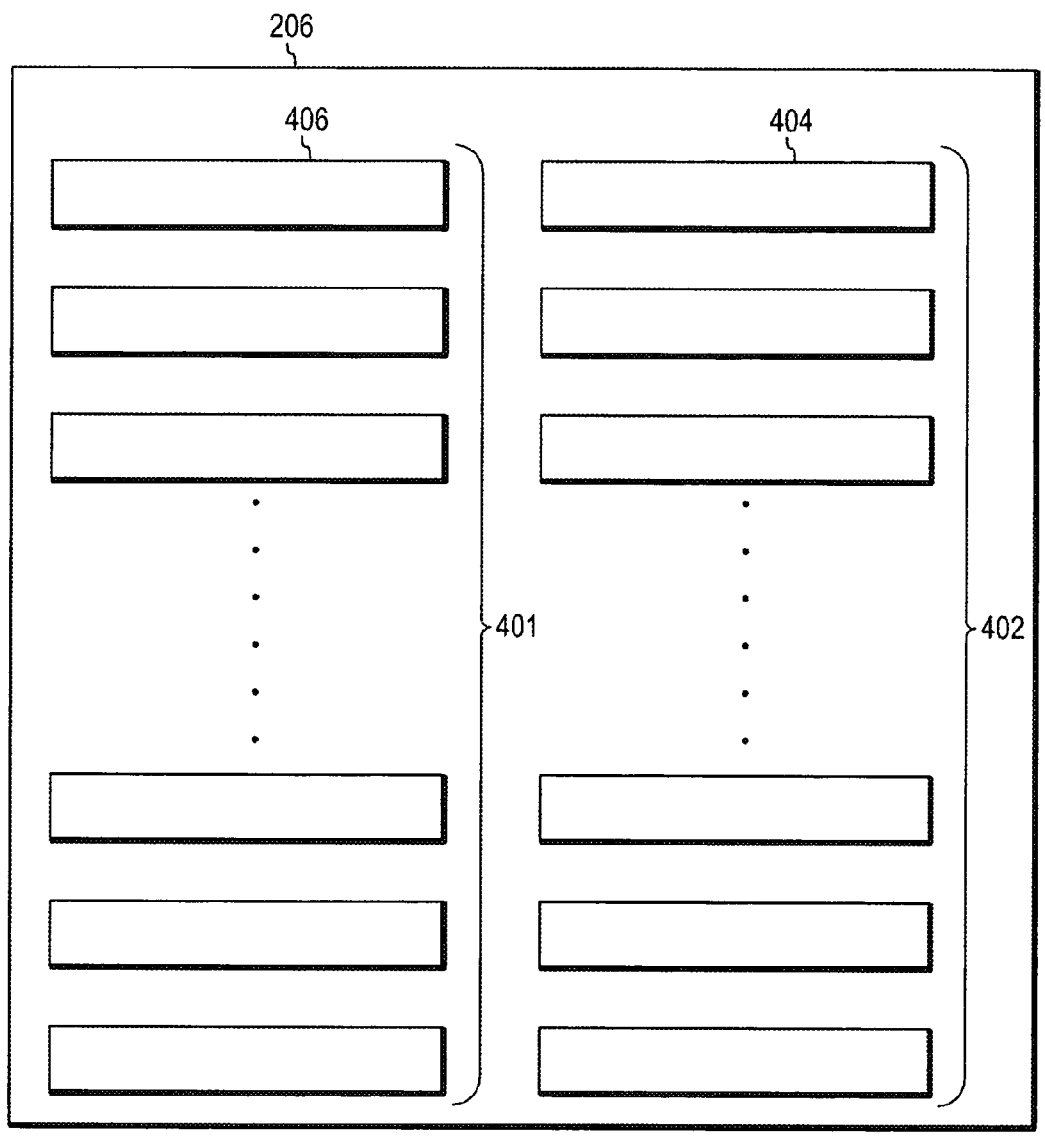
FIG. 7 is a schematic diagram illustrating the structure and contents of the variable resolution table shown in FIG. 5.

Each of the call routing control scripts 200 includes one or more call routing script instructions (collectively and/or singly referred to by numeral 302 shown in FIG. 6). In system 10, depending upon the particular script, these instructions 302 may comprise one or more special instructions (referred to collectively and/or singly by numeral 304 shown in FIG. 6) of a predetermined type. The instructions 302 in scripts 200 control the manner in which calls are routed in system 10 by routing engine 48. That is, the instructions 302 are retrieved by engine 48 from database 54 (via retriever 50 and database manager 52) and after being compiled into an executable form by engine 48, are executed by engine 48 to generate the control signals that are supplied by engine 48 to the interfaces 33, 34 to control routing and distribution of calls in the system 10, and also otherwise control the operation of the functional components of system 10.

Special instructions 304, in essence, constitute or comprise function calls that, when executed by the engine 48, cause control signals to be supplied to the functional components of system 10 that cause these components to route calls to desired labels. These function calls 304 contain (e.g., as function arguments) variables or variable expressions whose respective values are not determined by engine 48 prior to execution of the instructions 304, but instead, are determined by the engine 48 only when the instructions 304 are executed by the engine 48 (i.e., at run-time of the script 300 containing the instructions 304). Engine 48 determines the respective values of these variables, by examining, at run-time of the special instructions 304 containing the variables, the contents of table 206.

More specifically, in table 206, each of the variables (collectively referred to by numeral 401) that are permitted to be referenced or contained in the function calls 304 is associated with a respective value (collectively referred to by numeral 402) that engine 48 is to use at script run-time as being the respective value of that variable. For example, for purposes of illustration, if one assumes that one of the instructions 304 contains or references a variable 406, when that instruction is executed by the engine 48, the engine determines the value of that variable 406 to be the respective value 404 associated with variable 406 in table 206.

In this embodiment of the technique of the present invention, each of the values 402 associated with the variables 401 specifies a particular label (e.g., by being or comprising a destination telephone number, trunk group number, or DNIS number). When a particular instruction 304 is executed that contains or references such a variable (e.g., variable 406), the execution of that instruction 304 causes the engine 48 to provide the routing client(s) (e.g., the functional component or components in system 10 through which a particular call is to be routed to the call's desired destination) via the interfaces 33, 34 (and possibly the wide area network if necessary) control signals that cause the routing client(s) to route the call to the label specified by the value (e.g., value 404) associated with that variable 406. Alternatively, if the instruction 304 contains a variable expression, the engine 48 evaluates that expression to determine the particular label to which the call is to be routed. For example, the expression may be an index into an array (not shown) in the database 54 in which possible caller-entered digits (e.g., possible to be entered by a caller by interaction with, and in response to, prompts from IVR 74) are associated with values specifying a respective labels to which a call whose caller entered those digits is to be routed, or specifying multiple such labels (e.g., to permit routing client(s) to determine therefrom an optimal label to which to route the call). The variable expression is evaluated by the engine 48 at script run-time to be equal to the value(s) specifying such label(s) and the instruction 304, when executed, may cause the engine 48 to provide to the routing client(s) control signals that cause the routing client(s) to route the call to an optimal destination specified by the label(s).

Such variable expressions may be used to advantage e.g., in connection with script instructions for routing calls to alternate destinations when an initial desired destination is busy or unavailable. For example, the script instructions may cause a call to be routed to an IVR 74 if an initial agent destination is busy, the IVR 74 may supply caller-entered digits to the controller 30 (e.g., entered in response to IVR prompts concerning requested services to be provided to the caller), and the instructions may route the call to an alternate destination based upon such caller-entered digits in accordance with the process described above.

Thus, it is evident that there has been provided an inventive technique for call routing control based upon execution of call routing scripts that fully satisfies both the aims and objectives hereinbefore set forth. It will be appreciated that although specific embodiments and methods of use of the present invention have been presented, many modifications, alternatives and equivalents thereof will be apparent to those skilled in the art. Accordingly, the technique of the present invention should be viewed broadly as encompassing all such modifications, alternatives and equivalents, and as being defined only as set forth in the hereinafter appended claims.

What is claimed is:

1. A method for controlling call routing by a communication system, comprising:

receiving a call;

executing a script in response to receiving said call, said script having instructions that when executed by the system control routing of said call in the system, the script including at least one call routing instruction that references a variable, a value of the variable being a telephone number of a destination of the call;

reading the value for said variable from a database, said database including a plurality of telephone numbers of destinations, said database having said value updated in response to action by a user; and setting the variable equal to the value, to determine the destination of the call in response to the value.

2. The method as in claim 1, further comprising:
reading said value of said variable from said database in response to execution of said at least one call routing instruction.

3. The method as in claim 1, further comprising:
computing a variable expression, in response to execution of said at least one call routing instruction, in determining said telephone number of said destination.

4. The method as in claim 1, further comprising:
executing said at least one call routing instruction in response to said value read from said database.

5. The method as in claim 1, further comprising:
executing by said script said at least one call routing instruction to read a selected variable from a plurality of variables whose respective values are stored in said database.

6. The method as in claim 5, further comprising:
specifying by said respective values one of a destination telephone number, trunk group, and DNIS.

7. A communication system, comprising:
means for receiving a call;
means for executing a script in response to receiving said call, said script having instructions that when executed by the system control routing of said call in the system, the script including at least one call routing instruction that references a variable, a value of the variable being a telephone number of a destination of the call;
means for reading the value for said variable from a database, said database including a plurality of telephone numbers of destinations, said database having said value updated in response to action by a user; and
means for setting the variable equal to the value, to determine the destination of the call in response to the value.

8. The communication system of claim 7, further comprising:
means for reading said value of said variable from said database in response to execution of said at least one call routing instruction.

9. The communication system of claim 7, further comprising:
means for computing a variable expression, in response to execution of said at least one call routing instruction, in determining said telephone number of said destination.

10. The communication system of claim 7, further comprising:
means for executing said at least one call routing instruction in response to said value read from said database.

11. The communication system of claim 7, further comprising:
means for executing by said script said at least one call routing instruction to read a selected variable from a plurality of variables whose respective values are stored in said database.

12. The communication system of claim 11, further comprising:
means for specifying by said respective values one of a destination telephone number, trunk group, and DNIS.

13. A communication system, comprising:
an interface to receive a call;
a routing engine to execute a script in response to receiving said call, said script having instructions that when executed by the routing engine control routing of said call in the system, the script including at least one call routing instruction that references a variable, a value of the variable being a destination of the call;
a database, said database holding the value for said variable, said database having said value updated in response to action by a user; and
said routing engine configured to, in response to said at least one call routing instruction, read said value for said variable from said database, said routing engine further configured to set the variable equal to the value, to determine a destination of the call in response to the value.

14. The communication system as in claim 13, further comprising:
a database engine to read said value of said variable from said database in response to execution of said at least one call routing instruction.

15. The communication system as in claim 13 wherein said routing engine is further configured to compute a variable expression, in response to execution of said at least one call routing instruction, in determining said destination.

16. The communication system as in claim 13 wherein said at least one call routing instruction is configured to specify one of a telephone number, trunk group, and DNIS, to which the call is to be routed.

17. The communication system as in claim 13, wherein said routing engine is further configured to execute said at least one call routing instruction in response to said value read from said database.

18. The communication system as in claim 13, further comprising: a retriever circuit to read a selected variable from a plurality of variables whose respective values are stored in said database.

19. The communication system as in claim 18, wherein said variables are configured to specify, said respective values, one of a destination telephone number, trunk group, and DNIS.

20. Software encoded in one or more tangible computer readable media and when executed operable to:
receive a call;
execute a script in response to receiving said call, said script having instructions that when executed control routing of said call, the script including at least one call routing instruction that references a variable, a value of the variable being a telephone number of a destination of the call;
read the value for said variable from a database, said database including a plurality of telephone numbers of destinations, said database having said value updated in response to action by a user; and
set the variable equal to the value, to determine the destination of the call in response to the value.

21. A method for controlling call routing in a communication system, the method comprising the steps of:
reading at least one call routing instruction from a call routing script the call routing instruction controlling the routing of a call to a destination, the call routing instruction including at least one variable whose value is undetermined prior to run-time of the call routing instruction,
at run-time of the call routing instruction, accessing a database external to the script and determining the value of the variable by reading a field of the database, the value of the variable being a particular trunk group that is the destination of the call; and
executing the call routing instruction using the value of the variable from the database.

22. The method of claim 21 further comprising the step of:
modifying the field of the database to associate a new value with the variable, to thereby change the operation of the call routing instruction without modifying the call routing instruction itself.

23. The method of claim 22 wherein the step of modifying is performed by a user.

24. A method for controlling call routing in a communication system, the method comprising the steps of:
reading at least one call routing instruction from a call routing script, the call routing instruction controlling the routing of a call to a destination, the call routing instruction including at least one variable whose value is undetermined prior to run-time of the call routing instruction;
at run-time of the call routing instruction, accessing a database external to the script and determining the value of the variable by reading a field of the database, the value of the variable being a dialed number identification service (DNIS) that is the destination of the call; and
executing the call routing instruction using the value of the variable from the database.

25. The method of claim 24 further comprising the step of:
modifying the field of the database to associate a new value with the variable, to thereby change the operation of the call routing instruction without modifying the call routing instruction itself.

26. The method of claim 25 wherein the step of modifying is performed by a user.

27. A communication system for call distribution, the communication system comprising:
a call routing engine configured to read at least one call routing instruction from a call routing script, the instruction controlling the routing of a call to a destination, the call routing instruction including at least one variable whose value is undetermined prior to run-time of the call routing instruction, the call routing engine further configured to execute the call routing instruction; and
a retriever circuit configured to access a database external to the script at run-time of the script and configured to determine the value of the variable from a field of the database, the value of the variable being a particular trunk group that is the destination of the call, the retriever circuit to supply the value to the call routing engine.

28. The communication system of claim 27 further comprising:
an interface configured to associate a new value with the variable, to thereby change the operation of the call routing instruction without modification of the call routing instruction itself.

29. The communication system of claim 28 wherein the interface is a user interface, and wherein the association of the new value with the variable is in response to a user action.

30. A communication system for call distribution, the communication system comprising:
a call routing engine configured to read at least one call routing instruction from a call routing script, the instruction controlling the routing of a call to a destination, the call routing instruction including at least one variable whose value is undetermined prior to run-time of the call routing instruction, the call routing engine further configured to execute the call routing instruction; and
a retriever circuit configured to access a database external to the script at run-time of the script and configured to determine the value of the variable from a field of the database, the value of the variable being a dialed number identification service (DNIS) that is the destination of the call, the retriever circuit to supply the value to the call routing engine.

31. The communication system of claim 30 further comprising:
an interface configured to associate a new value with the variable, to thereby change the operation of the call routing instruction without modification of the call routing instruction itself.

32. The communication system of claim 31 wherein the interface is a user interface, and wherein the association of the new value with the variable is in response to a user action.

33. A method comprising:
reading at least one call routing instruction from a call routing script, the call routing instruction controlling the routing of a call to a destination, the call routing instruction including a variable expression whose value when evaluated is the destination of the call, the value of the variable expression undetermined prior to run-time of the call routing instruction;
at run-time of the call routing instruction, evalulating the variable expression in part by accessing a database external to the script;
executing the call routing instruction using the value of the variable expression.

34. The method of claim 33 wherein the variable expression is an index into an array in the database, which stores a mapping of one or more caller-entered digits to call destinations.

35. The method of claim 33 further comprising:
modifying at least one field of the database to change the value of the variable expression when executed, without modifying the call routing instruction.

36. An apparatus comprising:
a call routing engine configured to read at least one call routing instruction from a call routing script, the instruction controlling the routing of a call to a destination, the call routing instruction including a variable expression whose value when evaluated is the destination of the call, the value of the variable expression undetermined prior to run-time of the call routing instruction,
a retriever circuit configured to access data in a database external to the script at run-time of the script; and
wherein the call routing engine is further configured to evaluate the value of the variable expression in part using the data from the database, and to execute the call routing instruction using the value of the variable expression.

37. The apparatus of claim 36 wherein the variable expression is an index into an array in the database, which stores a mapping of one or more caller-entered digits to call destinations.

38. The apparatus of claim 36 further comprising:
an interface configured to modify at least one field of the database to change the value of the variable expression when executed, without modification of the call routing instruction.

* * * * *